(12) United States Patent
Yoon et al.

(10) Patent No.: US 11,507,565 B2
(45) Date of Patent: *Nov. 22, 2022

(54) ACCELERATED PROCESSING APPARATUS FOR TRANSACTION AND METHOD THEREOF

(71) Applicant: SAMSUNG SDS CO., LTD., Seoul (KR)

(72) Inventors: Chang Suk Yoon, Seoul (KR); Kyu Sang Lee, Seoul (KR); Hwa Yong Oh, Seoul (KR); Sang Won Lee, Seoul (KR); Ki Woon Sung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 258 days.

This patent is subject to a terminal disclaimer.

(21) Appl. No.: 16/727,213

(22) Filed: Dec. 26, 2019

(65) Prior Publication Data

US 2020/0379981 A1 Dec. 3, 2020

(30) Foreign Application Priority Data

Jun. 3, 2019 (KR) .................. 10-2019-0065586

(51) Int. Cl.
*G06F 7/00* (2006.01)
*G06F 17/00* (2019.01)
(Continued)

(52) U.S. Cl.
CPC ...... *G06F 16/2379* (2019.01); *G06F 16/2365* (2019.01); *H04L 43/0882* (2013.01);
(Continued)

(58) Field of Classification Search
None
See application file for complete search history.

(56) References Cited

U.S. PATENT DOCUMENTS

2018/0300382 A1* 10/2018 Madisetti .............. H04L 9/3263
2018/0341875 A1* 11/2018 Carr ...................... G06F 16/353
(Continued)

FOREIGN PATENT DOCUMENTS

| CN | 109040029 A | 12/2018 |
|---|---|---|
| EP | 3 742 675 A1 | 11/2020 |
| KR | 10-2018-0014534 A | 2/2018 |

OTHER PUBLICATIONS

European Search Report For EP 20153851.9 dated Jul. 2, 2020 from European patent office in a counterpart European patent application.
(Continued)

*Primary Examiner* — Tuan A Pham
(74) *Attorney, Agent, or Firm* — The PL Law Group, PLLC

(57) ABSTRACT

An accelerated transaction processing apparatus includes a memory for storing one or more instructions, a communication interface for communicating with a blockchain network, and a processor. The processor is configured to determine whether the blockchain network is in a congested state based on monitoring information about the blockchain network, adjust a batch size based on a result of the determination, and perform batch processing for one or more individual transactions using the adjusted batch size.

16 Claims, 13 Drawing Sheets

(51) Int. Cl.
  *G06F 16/23*       (2019.01)
  *H04L 43/0882*     (2022.01)
  *H04L 43/0888*     (2022.01)
  *H04L 43/16*       (2022.01)
  *H04L 47/70*       (2022.01)
  *H04L 67/104*      (2022.01)

(52) U.S. Cl.
  CPC .......... *H04L 43/0888* (2013.01); *H04L 43/16* (2013.01); *H04L 47/822* (2013.01); *H04L 67/104* (2013.01)

(56) References Cited

U.S. PATENT DOCUMENTS

2019/0227727 A1\* 7/2019 Wang .................. G06F 3/067
2019/0266052 A1\* 8/2019 Lamba ................ H04L 63/123

OTHER PUBLICATIONS

Office action dated Feb. 17, 2022 from European patent office in a counterpart European Patent Application No. 20153851.9 (all the cited references are listed in this IDS.).

\* cited by examiner

ACCELERATED PROCESSING APPARATUS FOR TRANSACTION AND METHOD THEREOF

CROSS-REFERENCE TO RELATED APPLICATION

This application claims priority from Korean Patent Application No. 10-2019-0065586 filed on Jun. 3, 2019 in the Korean Intellectual Property Office, and all the benefits accruing therefrom under 35 U.S.C. 119, the contents of which in their entirety are herein incorporated by reference.

BACKGROUND

1. Technical Field

The present disclosure relates to an apparatus and method for accelerative processing a transaction. More specifically, the present disclosure relates to an apparatus for performing accelerated processing for a blockchain transaction based on batch processing and a method performed in the apparatus.

2. Description of the Related Art

A blockchain refers to a data management technique, in which persistently increasing data are recorded in blocks of a specific unit, and each blockchain node constituting a peer-to-peer (P2P) network manages the blocks in a data structure of a chain, or a data structure itself. A blockchain technology can guarantee the integrity and security of transactions through a consensus process, in which all blockchain nodes in a network record and verify transactions.

However, since the consensus process limits the processing power of a network to the processing power of a single node, it is also a major factor that degrades the transaction processing performance of a blockchain-based system. In other words, in a blockchain-based system, even if the number of blockchain nodes is increased, performance improvement of the system cannot be guaranteed. Therefore, it is not practical to introduce a blockchain technology in a field requiring rapid processing of a large amount of transactions, and it is still difficult for a blockchain-based system to replace a legacy system.

In conclusion, in order to advance the practical use of a blockchain technology and expand the scope of its application, it is urgently needed to solve a performance issue of a blockchain-based system.

SUMMARY

Aspects of the present disclosure provide an accelerated processing apparatus for blockchain transactions based on batch processing to improve transaction processing performance of blockchain based systems and a method performed on the apparatus.

Aspects of the present disclosure also provide an apparatus capable of minimizing transaction processing delay due to batch processing and maximizing transaction processing performance by adjusting a batch size based on monitoring information about a blockchain network, and a method performed on the apparatus.

Aspects of the present disclosure also provide an apparatus capable of quickly and accurately determining whether a blockchain network is in a congested state and a method performed on the apparatus.

Aspects of the present disclosure also provide an apparatus capable of accurately calculating an adjustment value of a batch size and the room performed on the apparatus.

The aspects of the present disclosure are not restricted to those set forth herein. The above and other aspects of the present disclosure will become more apparent to one of ordinary skill in the art to which the present disclosure pertains by referencing the detailed description of the present disclosure given below.

According to the present disclosure, an apparatus for accelerative processing a transaction is provided. The apparatus includes a memory for storing one or more instructions, a communication interface for communicating with a blockchain network, and a processor. The processor may be configured to, by executing the one or more instructions, determine whether the blockchain network is in a congested state based on monitoring information about the blockchain network, adjust a batch size based on a result of the determination, and perform batch processing for one or more individual transactions using the adjusted batch size.

According to the present disclosure, a method for accelerative processing one or more individual transactions associated with a blockchain network in a computing device is provided. The method includes obtaining monitoring information about the blockchain network, determining whether the blockchain network is in a congested state based on the monitoring information, adjusting a batch size based on a result of the determination, and performing batch processing for the one or more individual transactions using the adjusted batch size.

According to the present disclosure, a computer program stored on a non-transitory computer-readable recording medium is provided. The computer program, in combination with a computing device, executes steps of obtaining monitoring information about a blockchain network, determining whether the blockchain network is in a congested state based on the monitoring information, adjusting a batch size based on a result of the determination, and performing batch processing for one or more individual transactions using the adjusted batch size.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, some embodiments of the present disclosure will be described in detail with reference to the accompanying drawings.

Figure 1:
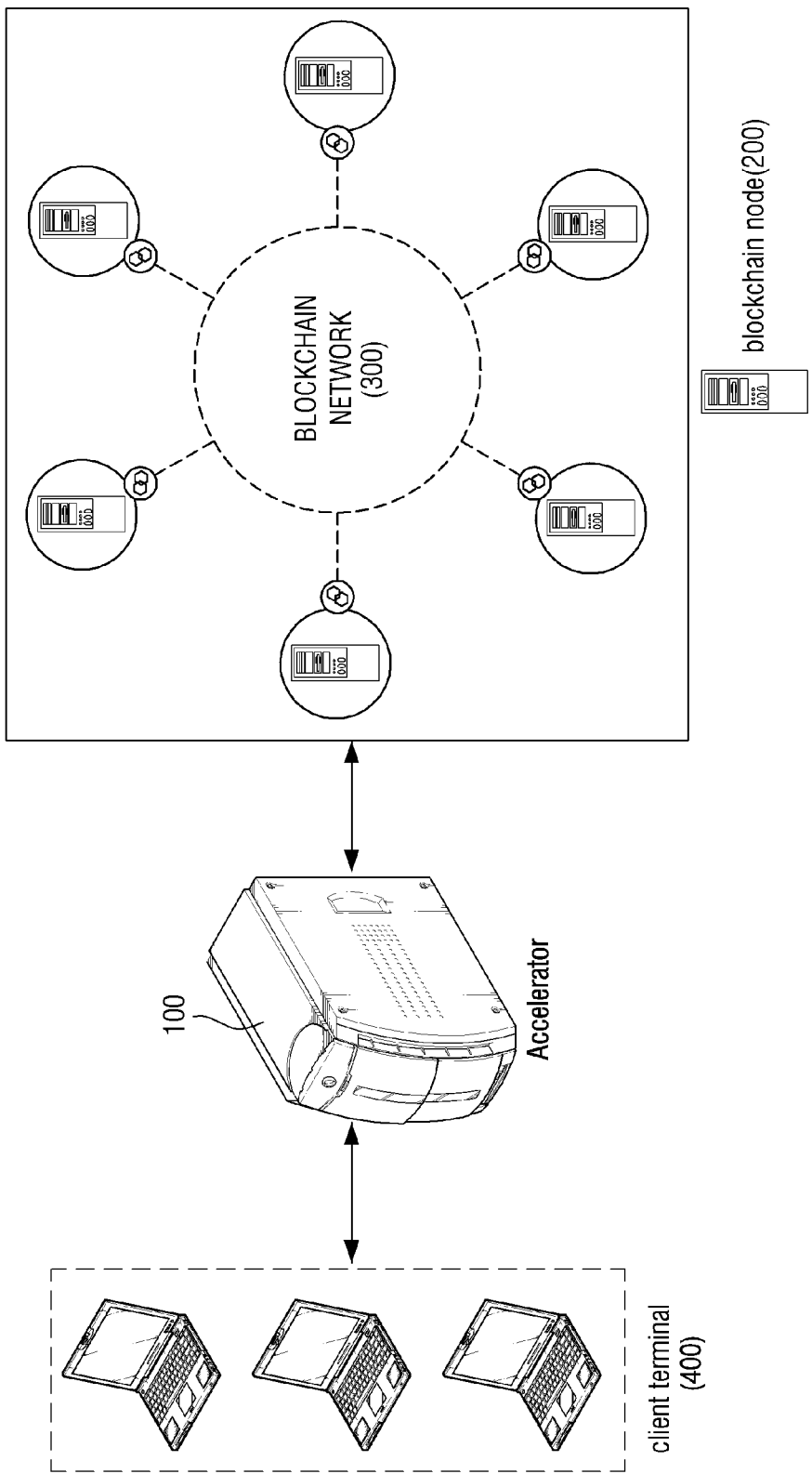
FIG. 1 is an exemplary configuration diagram illustrating a blockchain-based transaction processing system according to some embodiments of the present disclosure.

FIG. 1 is an exemplary configuration diagram illustrating a blockchain-based transaction processing system according to some embodiments of the present disclosure.

As shown in FIG. 1, the transaction processing system may include a transaction accelerated processing apparatus 10 and a plurality of blockchain nodes 200 constituting a blockchain network 300. However, this is merely an embodiment for achieving the objectives of the present disclosure, and some components can be added or removed as needed. Further, it should be noted that each component illustrated in FIG. 1 is functionally distinct component and that at least one component can be integrated with each other in an actual physical environment. For example, the transaction accelerated processing apparatus 100, a client terminal 400 and/or the blockchain nodes 200 may be implemented as different logic elements within the same physical computing device. That is, the transaction accelerated processing apparatus 100 may operate as the blockchain nodes 200, and the batch processing function may be implemented on the client terminal 400 side.

Hereinafter, reference number "200" is used to refer to any blockchain node, and in case of distinguishingly referring to blockchain nodes, an alphabet (e.g., a, b, c) is included in reference number "200." Similarly, reference number "400" is also used to refer to any client terminal, and in case of distinguishingly referring to client terminals, an alphabet (e.g., a, b, c) is included in the reference number "400." Further, for convenience of description, the transaction accelerated processing apparatus 100 will be abbreviated as an accelerator.

Figure 2:
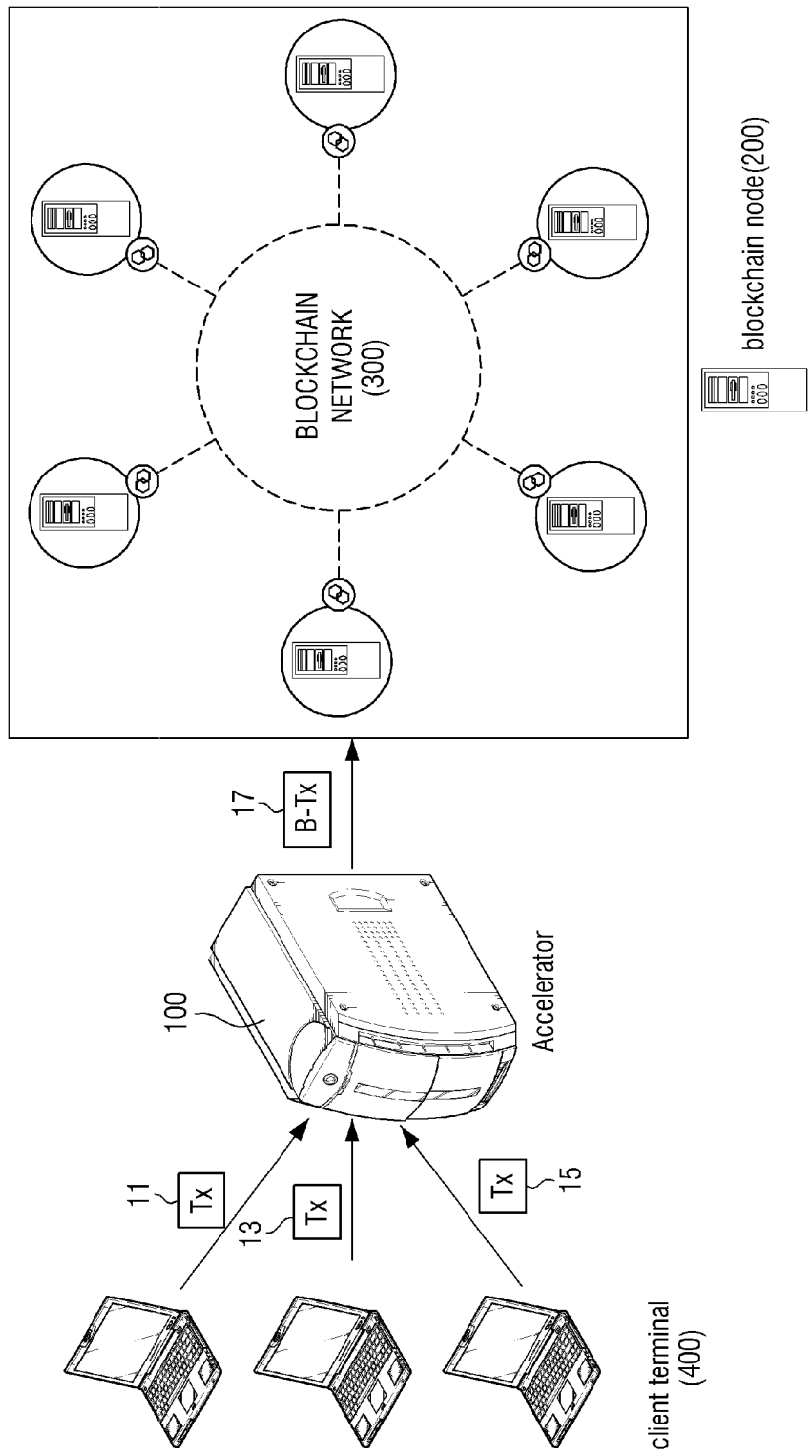
FIG. 2 is an exemplary diagram illustrating batch processing operations of a transaction accelerated processing apparatus according to some embodiments of the present disclosure.

In the transaction processing system, the accelerator 100 is a computing device that performs accelerated processing for a transaction based on batch processing. For example, as shown in FIG. 2, the accelerator 100 generates a batch transaction 17 by aggregating a plurality of individual transactions 11, 13 and 15 requested by the client terminal 400, and batch processes the batch transaction 17 interworking with the blockchain network 300. Further details of the batch processing will be described later with reference to FIGS. 4 to 7.

Figure 14:
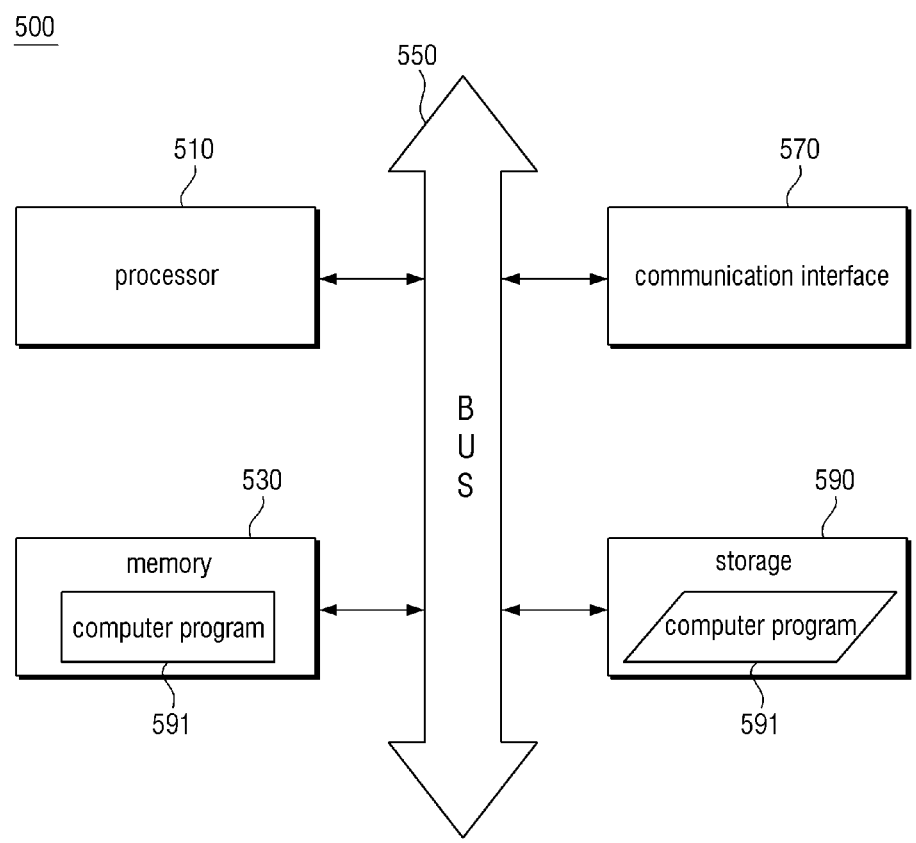
FIG. 14 illustrates an example computing device that may implement an apparatus in accordance with various embodiments of the present disclosure.

Here, the computing device may be a laptop computer, a desktop, a laptop, or the like, but is not limited thereto, and may include any type of device equipped with a computing function and a communicating function. However, in an environment, in which a large amount of transaction processing is required, the accelerator 100 may be preferably implemented as a high performance server-class computing device. FIG. 14 illustrates an example of the computing device.

According to various embodiments of the present disclosure, the accelerator 100 may determine whether the blockchain network 300 is in the congested state based on monitoring information about the blockchain network 300, and adjust a batch size based on a result of the determination. The batch size may refer to a value or parameter for adjusting the number of individual transactions included in a batch transaction. For example, the accelerator 100 may increase the batch size or activate a batch processing function in response to determining that the blockchain network 300 is in the congested state. Thereby, congestion of the blockchain network 300 is eliminated, and the transaction processing performance of the system may be improved. As another example, the accelerator 100 may decrease the batch size or deactivate the batch processing function in response to determining that the blockchain network 300 is in the normal state (i.e. not congested). Thereby, a time the transaction waits until the batch transaction is generated may be decreased, and ultimately the processing time of the transaction (i.e. response time) may be decreased. Further details of the present embodiment will be described later with reference to FIGS. 8 to 13.

Further details of the configuration and operation of the accelerator 100 will be described with reference to the drawings following FIG. 4.

FIG. 1 illustrates that one accelerator 100 is disposed as an example, the number and arrangement of the accelerators 100 may be variously designed and selected according to an embodiment. That is, in some other embodiments, a plurality of accelerators (e.g., 100a, 100b of FIG. 3) may be arranged. By doing so, the performance, stability and availability of the transaction processing system can be further improved. In this case, the interworking relationship between the accelerator 100 and the blockchain node 200 may be configured in various forms as shown in the following embodiments.

In some embodiments, each of the plurality of accelerators 100 is cooperated with all blockchain nodes 200, and a transaction requested by the client terminal 400 may be distributed and processed through the plurality of accelerators 100. In other words, the transaction requested by the client terminal 400 is distributed to any one accelerator 100, and the accelerator 100 processes the transaction in cooperation with the entire blockchain node 200.

Figure 3:
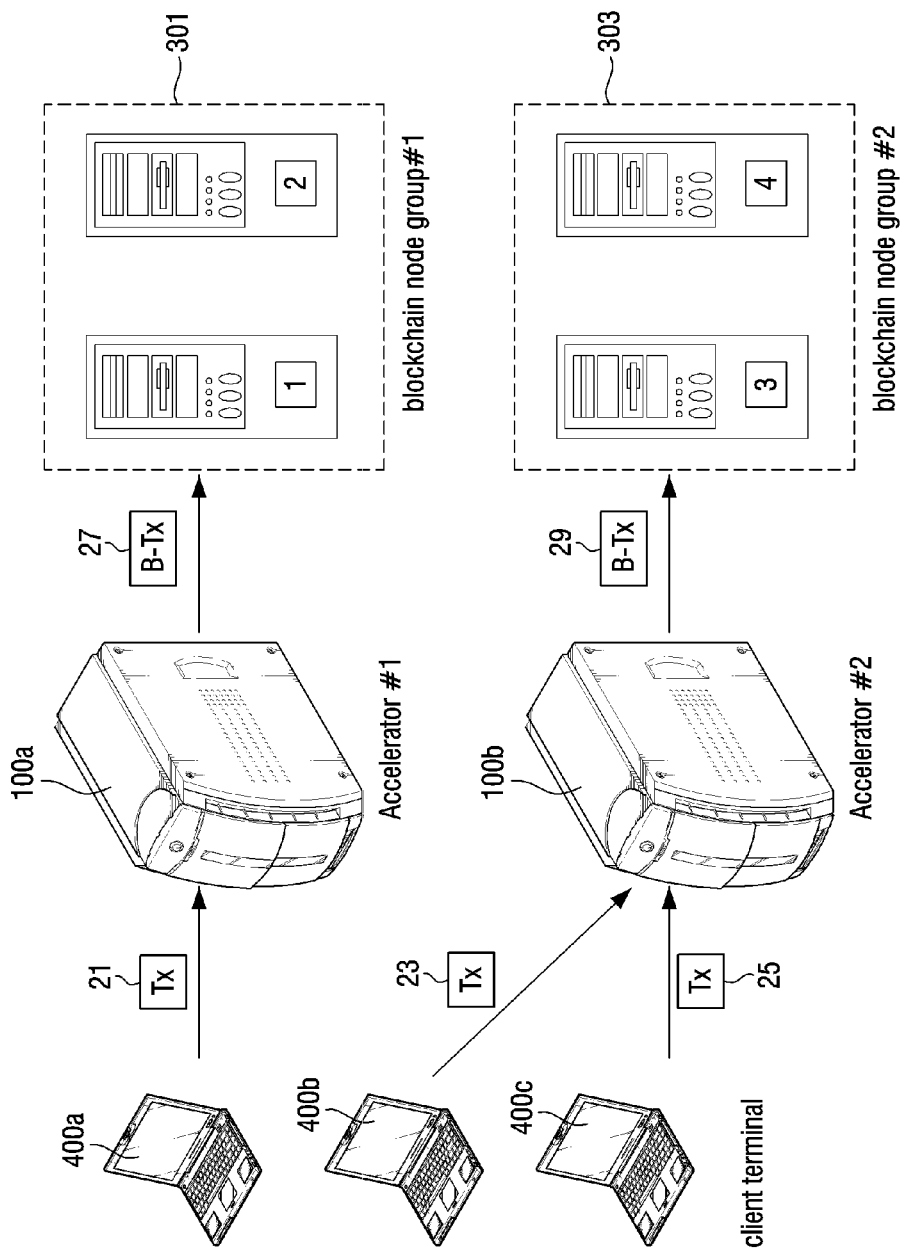
FIG. 3 is an exemplary diagram for describing an interworking relationship between a transaction accelerated processing apparatus and a blockchain node according to some embodiments of the present disclosure.

In some other embodiments, as shown in FIG. 3, each of the plurality of accelerators 100a and 100b may interwork with some blockchain nodes 301 or 303. For example, a first accelerator 100a may interwork with a first blockchain node group 301, and a second accelerator 100b may interwork with a second blockchain node group 303. In this embodiment, the accelerators 100a and 100b interwork with their dedicated blockchain node groups 301 and 303 to process requested transactions 21 to 25 in batch form (e.g., 27 and 29). In some embodiments, the first blockchain node group 201 may correspond to a first channel of the blockchain network 300, and the second blockchain node group 303 may correspond to a second channel of the blockchain network 300. That is, dedicated accelerators (e.g., 100a and 100b) may be allocated to each channel of the blockchain network 300. According to an embodiment, a dedicated accelerator 100 may be allocated to each blockchain node 200.

In some embodiments, a certain device (not shown) may provide a list of accelerators (e.g., 100a and 100b of FIG. 3) to the client terminal 400. Further, the device (not shown) may provide load information of each accelerator (e.g., 100a and 100b of FIG. 3) as well. The load information may include the load information (e.g., CPU utilization) of the accelerators (e.g., 100a and 100b of FIG. 3) and the load information of blockchain nodes (e.g., 301 and 303) interworked with each accelerator (e.g., 100a and 100b of FIG. 3). In the present embodiment, the client terminal 400 may select a specific accelerator (e.g., 100a and 100b of FIG. 3) based on the list of accelerators and load information, and a requested transaction can be processed through the selected accelerator (e.g., 100a and 100b of FIG. 3). The function of the device (not shown) may be implemented in the accelerator (e.g., 100a and 100b of FIG. 3), but the technical scope of the present disclosure is not limited thereto.

In the transaction processing system, the blockchain node 200 constitutes the blockchain network 300 having a P2P structure, and is a node operating according to a blockchain protocol. Each blockchain node 200 may manage a ledger. In some embodiments, the ledger may include a blockchain, in which transaction data is recorded, and a state database, in which state data (e.g., state values corresponding to state keys) are stored. However, the technical scope of the present disclosure is not limited thereto. The blockchain node 200 may share various smart contracts and transaction data through a blockchain, and may guarantee the integrity and security of a transaction through a consensus process.

In various embodiments of the present disclosure, the blockchain node 200 may perform batch consensus process for a batch transaction. Specifically, the blockchain node 200 can perform a series of consensus process in batches, such as execution of a smart contract of an individual transaction included in a batch transaction, signature of the execution result of the smart contract, recordation of the signature and the execution result into a block and propagation of them. Since a specific process of the consensus process may vary depending on an implementation method of a blockchain-based system, the technical scope of the present disclosure is not limited to a specific type of consensus process.

In various embodiments of the present disclosure, the blockchain node 200 may distinguish an execution result of a batch transaction by individual transaction (or by state data) through smart contract-based processing, and use the distinguished execution results to update a ledger. Further details will be described later with reference to FIGS. 5 to 7.

Meanwhile, according to some embodiments of the present disclosure, a plurality of blockchain nodes 200 may be configured with different types of nodes. Further, at least some of the different types of blockchain nodes may perform different operations. For example, a first type of a blockchain node (e.g., an "endorsing peer" of a hyperledger fabric) may execute a smart contract and sign the result of the execution. Further, a second type of blockchain node (e.g., an "orderer" of a hyperledger fabric) may perform a main consensus process on an execution result of a smart contract, or perform operations of recording the execution result into a block and propagating it. Hereinafter, the second type of blockchain node will be referred to as a "consensus node" to distinguish it from the first type of blockchain node. A process of processing a transaction in an environment where a consensus node exists will be described with reference to FIG. 6.

In the transaction processing system, the client terminal 400 is a terminal provided with a processing service for a transaction. The client terminal 400 can generate a transaction, transmit the generated transaction to the accelerator 100 and/or the blockchain network 300, and be provided with a processing result of the transaction from the accelerator 100 and/or the blockchain network 300.

In various embodiments of the present disclosure, the client terminal 400, the accelerator 100 and the blockchain node 200 may communicate through a network. The network may be implemented as any type of wired/wireless network such as a Local Area Network (LAN), a Wide Area Network (WAN), a mobile radio communication network and a Wireless Broadband Internet (Wibro).

So far, the blockchain-based transaction processing system according to some embodiments of the present disclosure has been described with reference to FIGS. 1 to 3. Hereinafter, a configuration of the accelerator 100 and batch processing function according to some embodiments of the present disclosure will be described in detail with reference to FIGS. 4 to 7.

Figure 4:
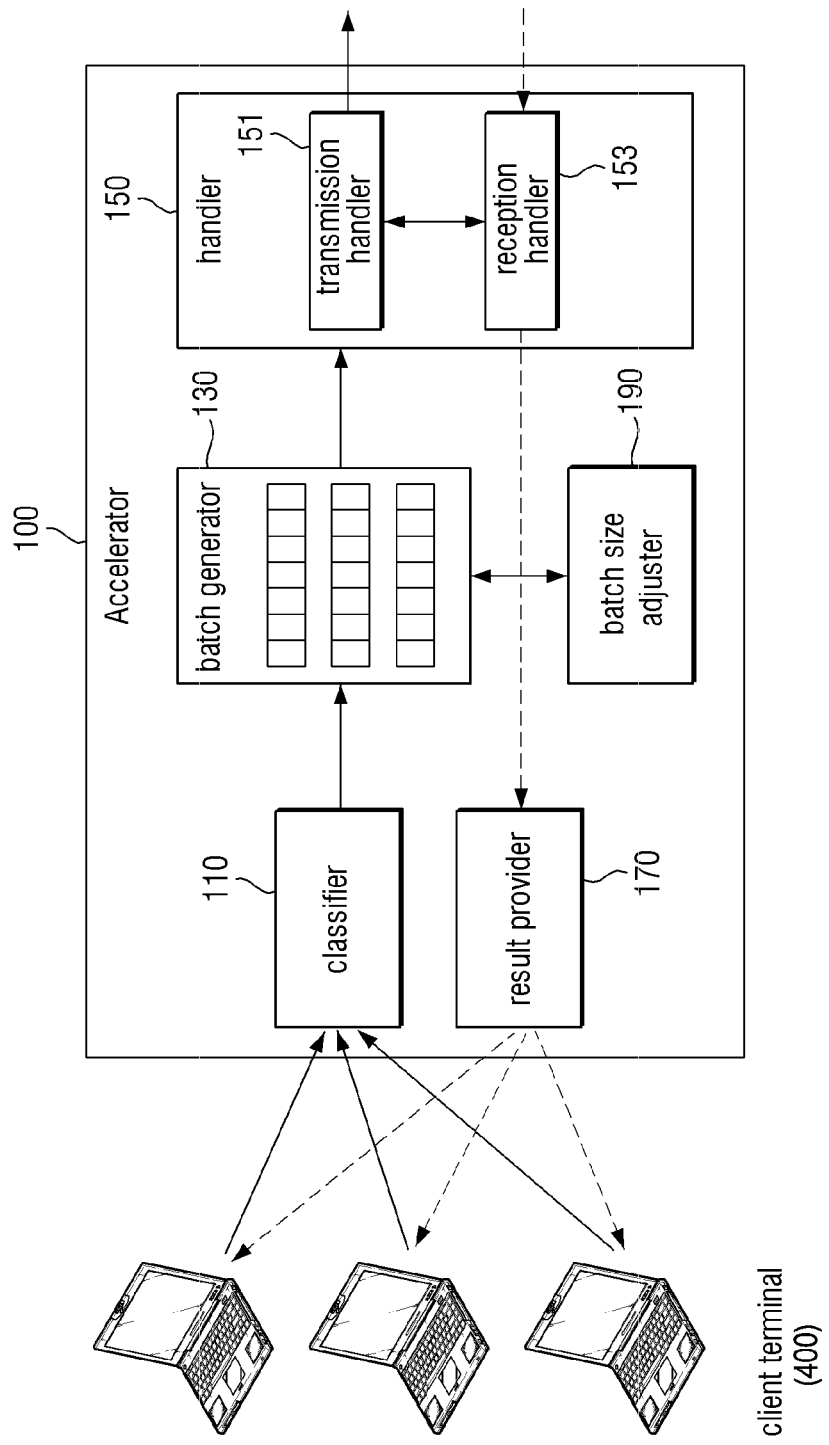
FIG. 4 is an exemplary block diagram illustrating a transaction accelerated processing apparatus according to some embodiments of the present disclosure.

FIG. 4 is an exemplary block diagram illustrating an accelerator 100 according to some embodiments of the present disclosure.

As shown in FIG. 4, an accelerator 100 may include a classifier 110, a batch generator 130, a handler 150, a result provider 170 and a batch size adjuster 190. However, FIG. 4 shows only the components related to the embodiment of the present disclosure. Therefore, it will be appreciated by those skilled in the art that the present disclosure may further include other general purpose components in addition to the components shown in FIG. 4. Further, each component of the accelerator 100 shown in FIG. 4 represents functional elements, which are functionally distinguished, and it is noted that at least one component may be embodied in an integrated form in an actual physical environment.

The classifier 110 classifies individual transactions requested by the client terminal 400 according to a predetermined classification criteria. In this case, the predetermined classification criteria may include an identifier of a smart contract, a channel identifier and/or a type of a transaction, an importance of a transaction, and the like, but is not limited thereto. The type of a transaction may include a write type and a read type. However, the technical scope of the present disclosure is not limited thereto, and a transaction type may be defined in various ways.

More specifically, the classifier 110 may classify each individual transaction by channel, smart contract, transaction type, and/or importance (e.g., classified as a write type transaction using a first smart contract of a first channel), and provide the classification result to the batch generator 130.

Next, the batch generator 130 generates a batch transaction by aggregating a plurality of individual transactions classified by the classifier 110. Specifically, the batch generator 130 inserts each of the classified transactions into a batch queue corresponding to the classification result. For example, the batch generator 130 may insert a first individual transaction classified as a first classification result into a first batch queue, and insert a second individual transaction classified as a second classification result into a second batch queue. Further, the batch generator 130 may aggregate individual transactions included in the specific batch queue and generate a batch transaction in response to determining that a specific batch queue (e.g., a first batch queue or a second batch queue) satisfies a predetermined batch generating condition.

The batch queue refers to a place for storing a transaction until a batch transaction is generated, and may be understood as a kind of transaction buffer or transaction pool. As can be understood from the name of a buffer queue, the batch queue may be implemented as a queue-based data structure, but since a method of implementing a batch queue may vary, the technical scope of the present disclosure is not limited to the method of implementing the batch queue.

In various embodiments of the present disclosure, the predetermined batch generating condition may include at least one of conditions based on whether a batch timer expires, a batch size (i.e., the number of transactions), a data size of the entire transaction, presence of association between transactions, and the like. Hereinafter, for convenience of understanding, a process of generating a batch transaction according to each batch generating condition will be further described.

In a first embodiment, the batch generator 130 may generate a batch transaction by aggregating individual transactions of a specific batch queue in response to an expiration event of a batch timer. In this case, the batch timer may exist for each batch queue, but the scope of the present disclosure is not limited thereto. A timer period of each batch queue may be the same or may be different. For example, a timer period of a high priority batch queue may be set relatively short, and a timer period of a low priority batch queue may be set relatively long. Through this process, a differential transaction processing service can be provided. According to this embodiment, a transaction waiting time according to batch processing may be limited within a predetermined time (e.g., a batch timer period). Therefore, the problem of delaying processing of some individual transactions due to batch processing can be alleviated.

In a second embodiment, the batch generator 130 may generate a batch transaction in response to determining that a data size of all transactions included in a particular batch queue is greater than or equal to a threshold value. In this case, the data size of all transactions may be calculated as the sum of data sizes of individual transactions, and the data sizes of the individual transactions may mean, for example, the size of transaction data recorded in a blockchain. However, the scope of the present disclosure is not limited thereto. The threshold value may be a predetermined fixed value or a variable value that varies depending on a situation. For example, the threshold value may be a fixed value set based on the maximum size of a block. For another example, the threshold value may be a fixed value or a variable value set based on the priority of a corresponding batch queue. For another example, the threshold value may be a variable value that is set to a larger value as load of the batch generator 130 increases. According to the present embodiment, since it can be prevented that too much data is included in one batch transaction, a processing failure probability of a batch transaction can be reduced.

In a third embodiment, the batch generator 130 may generate a batch transaction in response to determining that the number of individual transactions included in a particular batch queue satisfies a batch size. In this case, the batch size may be variably adjusted, and further details will be described later with reference to FIGS. 8 to 13.

In a fourth embodiment, the batch generator 130 may generate a batch transaction based on an association between individual transactions. Specifically, the batch generator 130 determines whether there is an associated transaction of a particular transaction. Here, the associated transaction means a transaction in which an association exists with the particular transaction. For example, it may be a transaction including an identification key of the same state data as the particular transaction. In other words, transactions that access the same state data as the particular transaction may be determined to be an associated transaction that has an association with the particular transaction. When it is determined that there is the associated transaction, the batch generator 130 may perform the batch processing in a variety of ways. Specific examples are as follows.

In a 4-1th embodiment, the batch generator 130 may generate and process a first individual transaction and a second individual transaction in which an association exists as different batch transactions.

In a 4-2th embodiment, the batch generator 130 may generate a batch transaction based on the remaining individual transactions except for the first transaction and the second transaction in which the association exists, and process the first transaction and the second transaction individually.

In a 4-3th embodiment, the batch generator 130 may process the first individual transaction in a batch form and process the second individual transaction individually, among the first individual transaction and the second individual transaction in which the association exists. In other words, the batch generator 130 may process some of the plurality of transactions in which the association exists in the batch form within a range in which a transaction conflict does not occur.

In a 4-4th embodiment, the batch generator 130 may determine whether the first individual transaction and the second individual transaction in which the association exists may be combined, and generate a third transaction in which the first individual transaction and the second individual transaction are combined in response to determining that they may be combined. Here, when an execution result of the third individual transaction is the same as a result of executing the first individual transaction and the second individual transaction, a method for generating the third individual transaction may be performed in any manner. In addition, the third individual transaction may be processed in the batch form, and may be processed individually.

According to the embodiments described above, batch processing may be performed within the range of not occurring conflict in consideration of association between transactions. Accordingly, the problem that the stability of transaction processing is lowered can be alleviated. In the above embodiment, for convenience of understanding, it has been described on the assumption that there is association between two transactions, but those skilled in the art could easily understand that if there is association between three or more transactions, it can be processed in the same or a similar manner.

In a fifth embodiment, the batch generator 130 may generate a batch transaction based on various combinations of the embodiments described above. For example, the batch generator 130 may generate a batch transaction further using a batch timer as well as a batch size. Specifically, the batch generator 130 may generate a batch transaction in response to determining that the number of transactions of a particular batch queue is greater than or equal to a batch size. Further, even when the number of transactions of the particular batch queue is less than a batch size, the batch generator 130 may generate a batch transaction in response to an expiration event of a batch timer. By doing so, transaction processing performance can be improved while minimizing processing delay due to batch processing.

Next, a handler 150 processes an individual transaction or a batch transaction in batches interworking with the blockchain network 300. The handler 150 may include a transmitting handler 151 and a receiving handler 153.

The transmitting handler 151 performs overall transmission of data such as a batch transaction. Specifically, in response to generating a batch transaction, the transmitting handler 151 may deliver the generated batch transaction to the blockchain network 300. Further, the transmitting handler 151 may further perform operations such as transmitting an execution result of a batch transaction signed by a blockchain node (e.g., an endorsement result) to a consensus node or retrying a batch transaction, which failed in processing.

The receiving handler 153 performs overall processing on data received from the blockchain network 300, such as a processing result of a batch transaction. Specifically, the receiving handler 153, in response to receiving a processing result for an individual transaction or a batch transaction, provides the processing result to a result provider 170. Further, the receiving handler 153 may further perform operations such as receiving a processing result of a signed batch transaction from the blockchain network 300 and delivering it to the transmitting handler 151.

Further details of the handler 150 will be described with reference to FIGS. 5 to 7.

Next, the result provider 170 receives a processing result for an individual transaction or a batch transaction from the receiving handler 153, and provides the processing result to the client terminal 400. More specifically, the result provider 170 may distinguish the processing result for a batch transaction by individual transaction unit, and provide the distinguished processing result to each client terminal 400. For example, the result provider 170 may generates a reference table composed of an identifier of the client terminal 400, a transaction identifier, an address of the client terminal 40, and the like, and uses the reference table to provide the processing result of each transaction to the client terminal 400. However, the technical scope of the present disclosure is not limited thereto.

Next, the batch size adjuster 190 adjusts a batch size based on whether the blockchain network 300 is in a congested state. Further, the batch size adjuster 190 may activate or deactivate a batch processing function. Here, deactivation of the batch processing function may be performed by setting a batch size to "1," but may be performed in any other way.

In order to exclude the redundant description, further details of an operation of the batch size adjuster 190 will be described with reference to the drawings following FIG. 8.

Each component 110 to 190 shown in FIG. 4 may refer to a software or a hardware, such as a Field Programmable Gate Array (FPGA) or an Application-Specific Integrated Circuit (ASIC). However, the components are not limited to a software or a hardware, and may be configured to be in an addressable storage medium, or may be configured to execute one or more processors. The functions provided in the above components may be implemented by more divided components, or may be implemented as one component that performs a specific function by combining a plurality of components.

Meanwhile, in some other embodiments of the present disclosure, the batch processing function of the accelerator 100 may be implemented on the client terminal 400 side. For example, when the client terminal 400 generates a plurality of individual transactions, it can aggregate the plurality of individual blockchain transactions and generate a batch transaction by itself. As another example, when a particular client terminal 400 receives a plurality of individual transactions from another client terminal, it can aggregate the plurality of individual transactions and generate a batch transaction.

Hereinafter, for convenience of understanding, a process, in which a write type transaction and a read type transaction are processed through the accelerator 100, will be described with reference to FIGS. 5 to 7. FIGS. 5 to 7 show an example, in which a batch size is "3".

Figure 5:
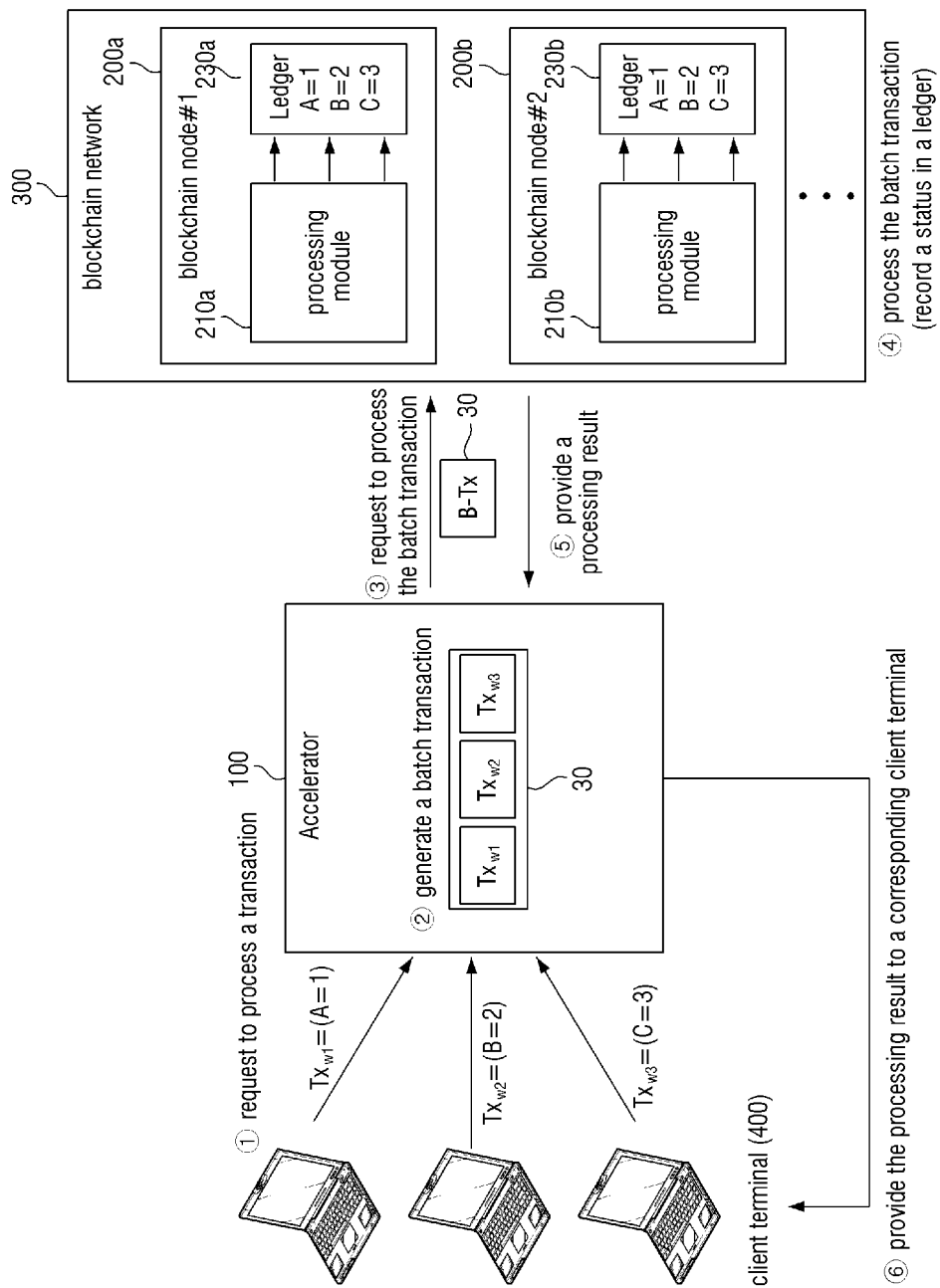
FIGS. 5 and 6 are exemplary diagrams for describing a process of processing a write type transaction according to some embodiments of the present disclosure.

FIG. 5 illustrates a process, in which a write type transaction is processed according to some embodiments of the present disclosure.

As illustrated in FIG. 5, an accelerator 100 may generate a batch transaction 50 by aggregating a plurality of write type transactions Txw1, Txw2, and Txw3 ((①, ②)). Specifically, according to a classification result of a classifier 110, a batch generator 130 may insert write type transactions Txw1, Txw2, and Txw3 into the same batch queue and generate a batch transaction 50 in response to determining that the number of write type transactions Txw1, Txw2, and Txw3 inserted into the batch queue satisfies a batch size.

Next, the accelerator 100 may request a blockchain network 300 to process the batch transaction 50 (③). Then, the blockchain nodes 200a and 200b constituting the blockchain network 300 can perform a consensus process for the batch transaction 50 and display an execution result of the batch transaction 50 on ledgers 230a and 230b (④).

As shown in FIG. 5, each blockchain node 230a and 230b may include processing modules 210a and 210b for processing the batch transaction 50. The processing modules 210a and 210b can distinguish the execution result of the batch transaction 50 by transaction (or by state data) using a smart contract, and update a ledger (e.g., a blockchain, a state DB) based on the distinguished execution result. In this case, the execution result of the batch transaction 50 may include a signature of a blockchain node, an identifier of an individual transaction, identification keys (A, B, C) and values (1, 2, 3) of state data, and the like. Accordingly, the processing modules 210a and 210b may distinguish the execution result of the batch transaction 50 by transaction (or by state) using the identification keys A, B, and C and/or the identifier of a transaction. In addition, the processing modules 210a and 210b may further process a batch transaction generated based on a read type transaction, which will be described later with reference to FIG. 7.

Next, the accelerator 100 may receive a processing result for the batch transaction 50 from the blockchain network 300 and provide the received processing result to a corresponding client terminal 400 ((⑤, ⑥).

In this case, when the processing result indicates a failure, a handler 150 of the accelerator 100 may retry processing of the batch transaction 50.

Figure 6:
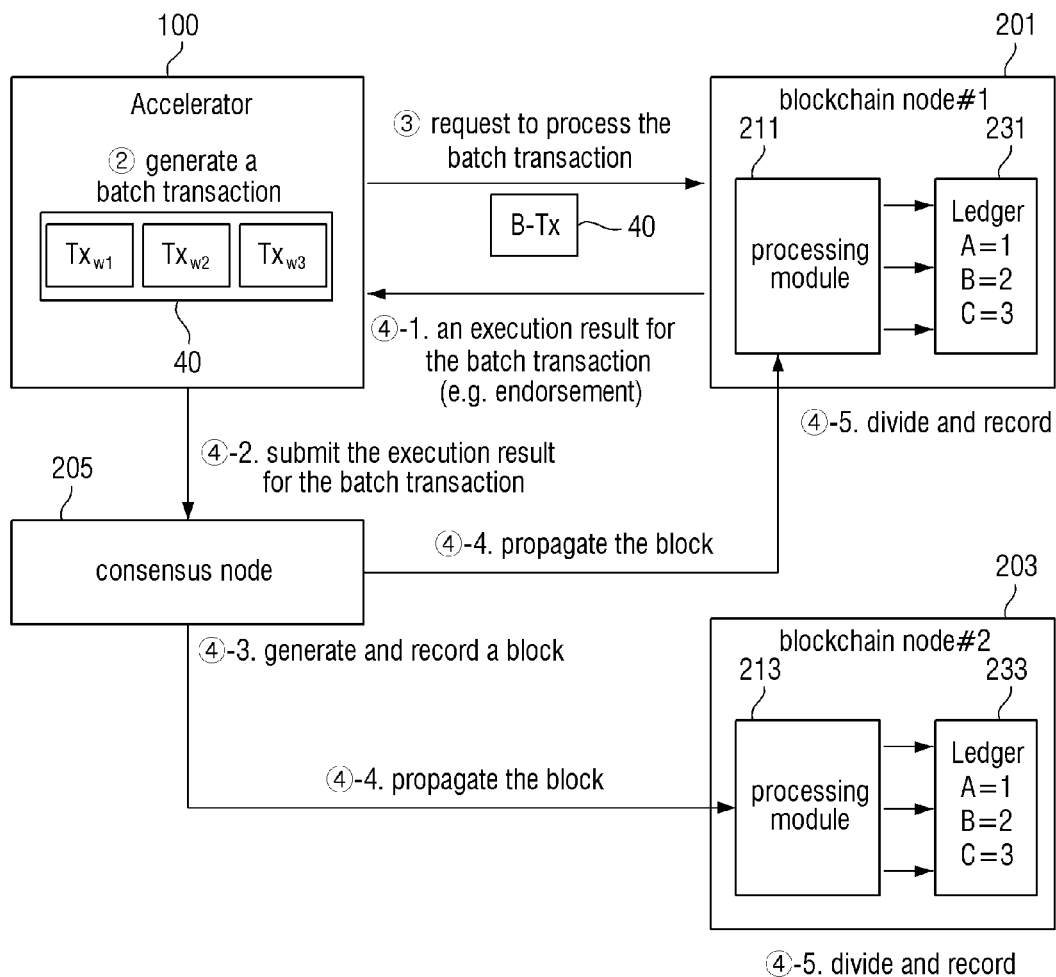

FIG. 6 illustrates a process, in which a write type batch transaction is processed in a blockchain-based system where a separate consensus node, such as a hyperledger fabric exists.

As shown in FIG. 6, an accelerator 100 may generate a batch transaction 40 and transmit the generated batch transaction 40 to a blockchain node 201 (②, ③). Further, the accelerator 100 may receive an execution result of the batch transaction 40 from the blockchain node 201 ((④-1). The execution result may include, as described above, a signature of the blockchain node 201 for the batch transaction 40, identification keys (A, B, C) and values (1, 2, 3) of state data, and the like.

Next, the accelerator 100 may submit the received execution result to a separate consensus node 205 ((④-2). The consensus node 205 then may verify the batch transaction 40 based on the execution result of the blockchain node 201, record the execution result on a new block, and propagate the new block on the blockchain network 300. ((④-3, ④-4). Finally, each blockchain node 201, 203 receiving the new block may distinguish the execution result of the batch transaction 40 by transaction (or state data) through a processing module 211, and update a ledger based on the distinguished execution result ((④-5).

As described with reference to FIGS. 5 and 6, when a transaction is processed through the accelerator 100, a plurality of transactions may be batch processed through batch processing. That is, a consensus process is not performed in the unit of an individual transaction, but the consensus process is performed in the unit of a batch transaction so that a plurality of transactions may be batch processed. Accordingly, transaction processing performance can be greatly improved. In an ideal environment, transaction processing performance would be improved in proportion to a batch size.

Hereinafter, a process of processing a read type transaction according to some embodiments of the present disclosure will be described with reference to FIG. 7.

Figure 7:
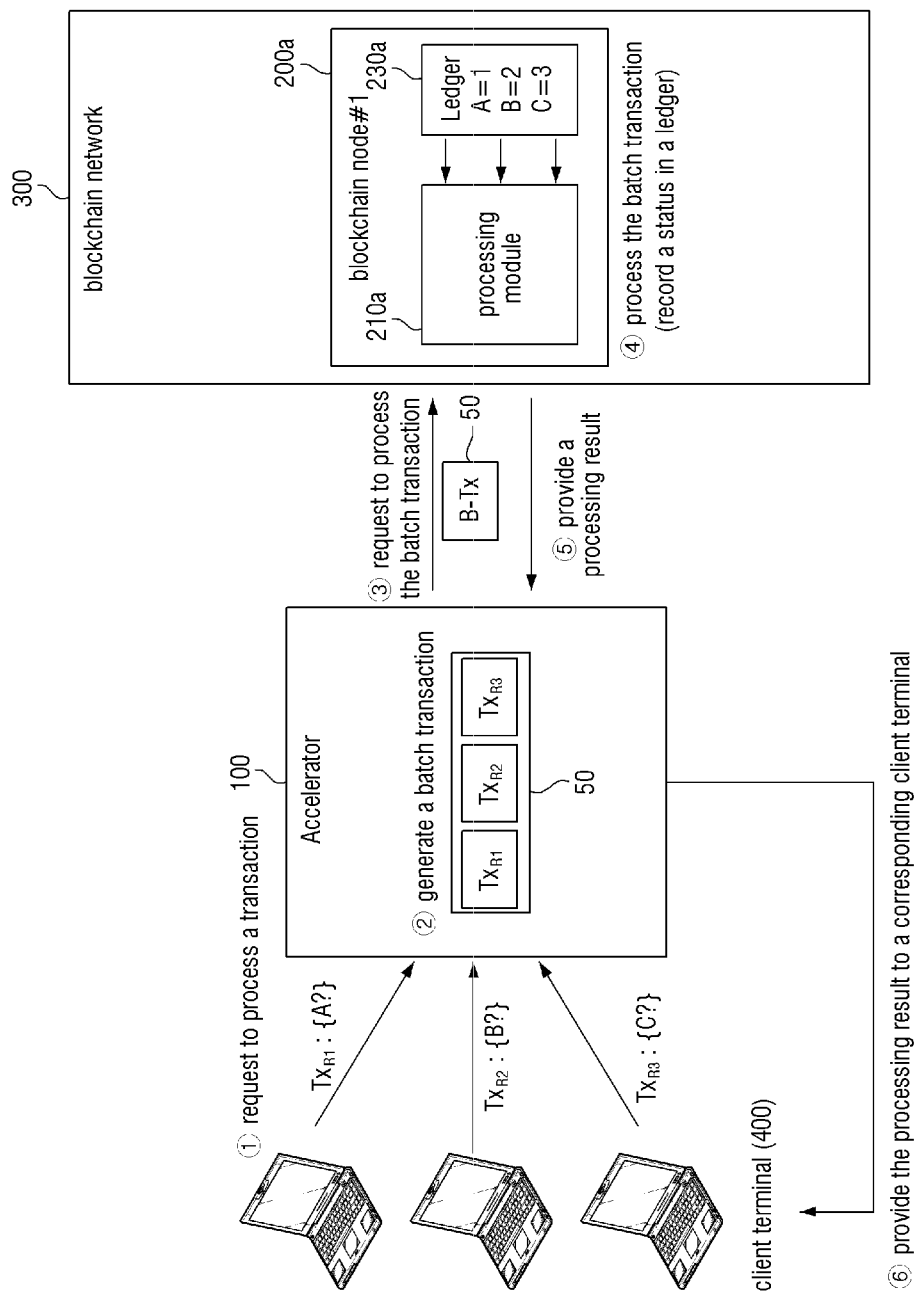
FIG. 7 is an exemplary diagram for describing a process of processing a read type transaction according to some embodiments of the present disclosure.

As shown in FIG. 7, the accelerator 100 may generate a batch transaction 50 by aggregating read type transactions TxR1, TxR2 and TxR3 and request the blockchain network 300 to process the batch transaction 50 (①, ②, ③).

A blockchain node 200a receiving the request may distinguish the batch transaction 50 by transaction (or by state data) through a processing module 210a and query state data (A, B, C) recorded in a ledger ((④). The distinguishing process may be performed through a smart contract based on transaction identifiers and/or identification keys (A, B, C) of state data.

Next, the accelerator 100 may receive the processing result (that is, the value of the inquired state data) of the batch transaction 50 from the blockchain node 200a and provide the processing result to a corresponding client terminal 400. (⑤, ⑥).

In this case, when the processing result indicates a failure, the handler 150 of the accelerator 100 may retry processing of the batch transaction 50.

So far, the process of processing a read type transaction through the accelerator 100 has been described with reference to FIG. 7. As described above, since a plurality of read type transactions can be batch processed in a batch form, transaction processing performance can be greatly improved.

So far, the configuration and batch processing functions of the accelerator 100 according to some embodiments of the present disclosure have been described with reference to FIGS. 5 to 7. According to some other embodiments, a plurality of accelerators may be operated. In such an embodiment, the accelerator 100 may share information with other external accelerators (not shown) to adjust the batch size. In this case, the accelerator 100 decreases the amount of computation required to adjust the batch size and obtains the benefit that the adjusted batch size accurately reflects a situation of a current blockchain node by using at least one of monitoring information about the blockchain network already generated by the other external accelerators, information about a blockchain network congestion state generated based on the analysis of the monitoring information about the blockchain network, and batch sizes used for batch transactions of the other external accelerators. Hereinafter, some implementation related to the present embodiment will be described.

In an embodiment, the information may be shared through peer-to-peer (P2P) communication between accelerators. Here, the accelerator may reflect information received from another accelerator in at least one of determining whether the network is in the congested state and adjusting the batch size.

In another embodiment, the information may be shared via separate storage shared between accelerators. For example, the storage may be a database to which the accelerator has read/write access. The database may be implemented in the form of a relational database, or may be implemented in the form of a NoSQL database. Here, the accelerator may reflect the information recorded by another apparatus for accelerative processing a transaction obtained by inquiring the storage to at least one of determining whether the network is in the congested state and adjusting the batch size.

Hereinafter, a function for adjusting a batch size will be described in detail with reference to FIGS. 8 to 13.

Figure 8:
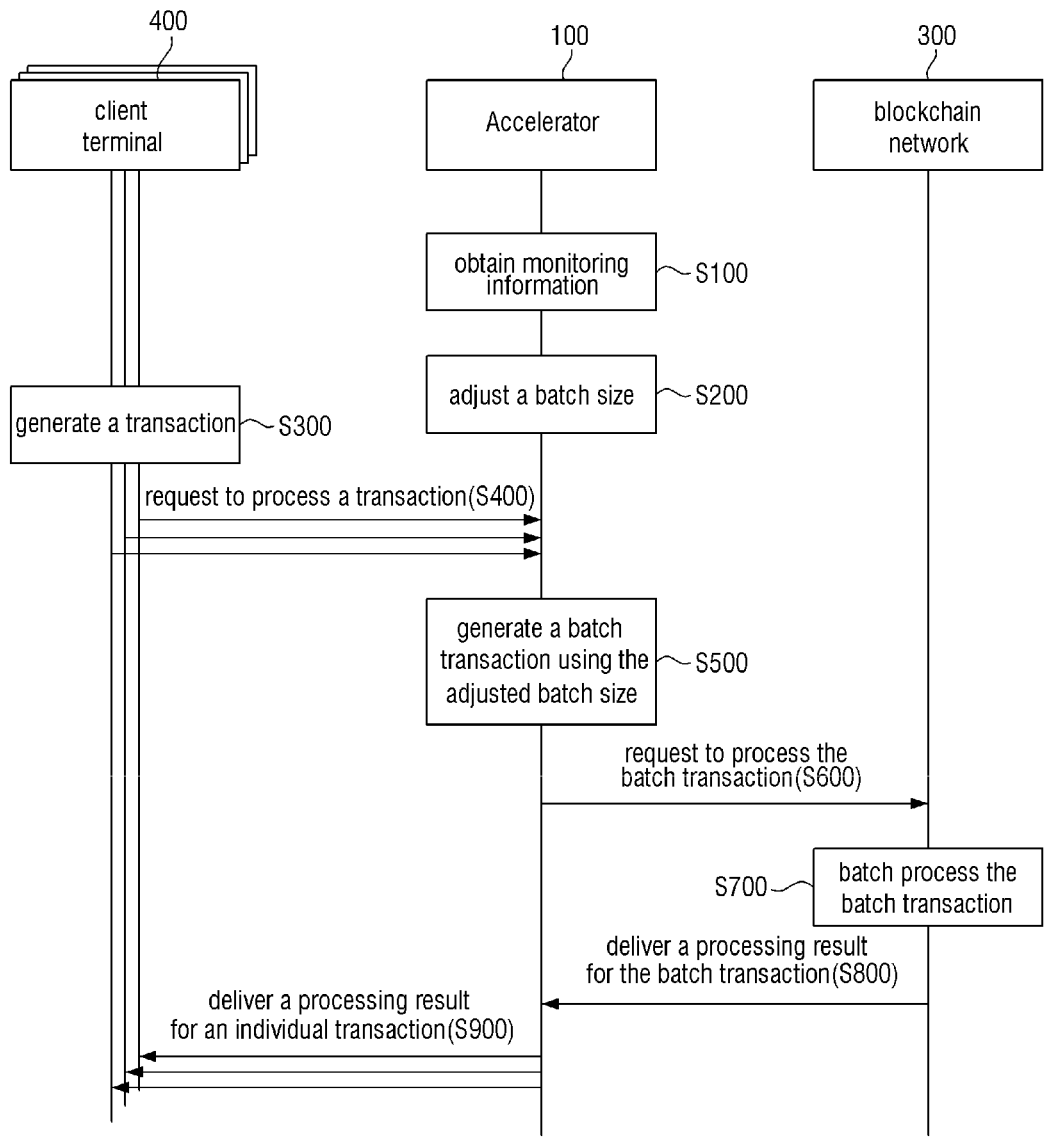
FIG. 8 is an exemplary flowchart illustrating a transaction accelerated processing method according to some embodiments of the present disclosure.

FIG. 8 is an exemplary flowchart illustrating an apparatus for accelerative processing a transaction according to some embodiments of the present disclosure. FIG. 8 illustrates a flow in which a method for accelerative processing a transaction in the system illustrated in FIG. 1 is performed. However, this is only a preferred embodiment for achieving the object of the present disclosure. Naturally, some steps may be added or deleted as necessary.

As shown in FIG. 8, the method for accelerative processing the transaction begins at step S100 of obtaining monitoring information for the blockchain network 300. The monitoring information may include a processing time of a transaction and an inflow amount of a transaction response. The transaction response may refer to a response message sent by the blockchain network 300 to the accelerator 100 after the processing of the transaction is completed (that is, after the transaction data is written to a block). Further, the inflow amount of the response of the transaction may refer to the number of transaction responses per unit time incoming into the accelerator 100 from the blockchain network 300. In addition, the monitoring information may further include various information to determine whether the blockchain network 300 is in the congested state.

The specific way of monitoring the blockchain network 300 may vary depending on embodiments.

Figure 9:
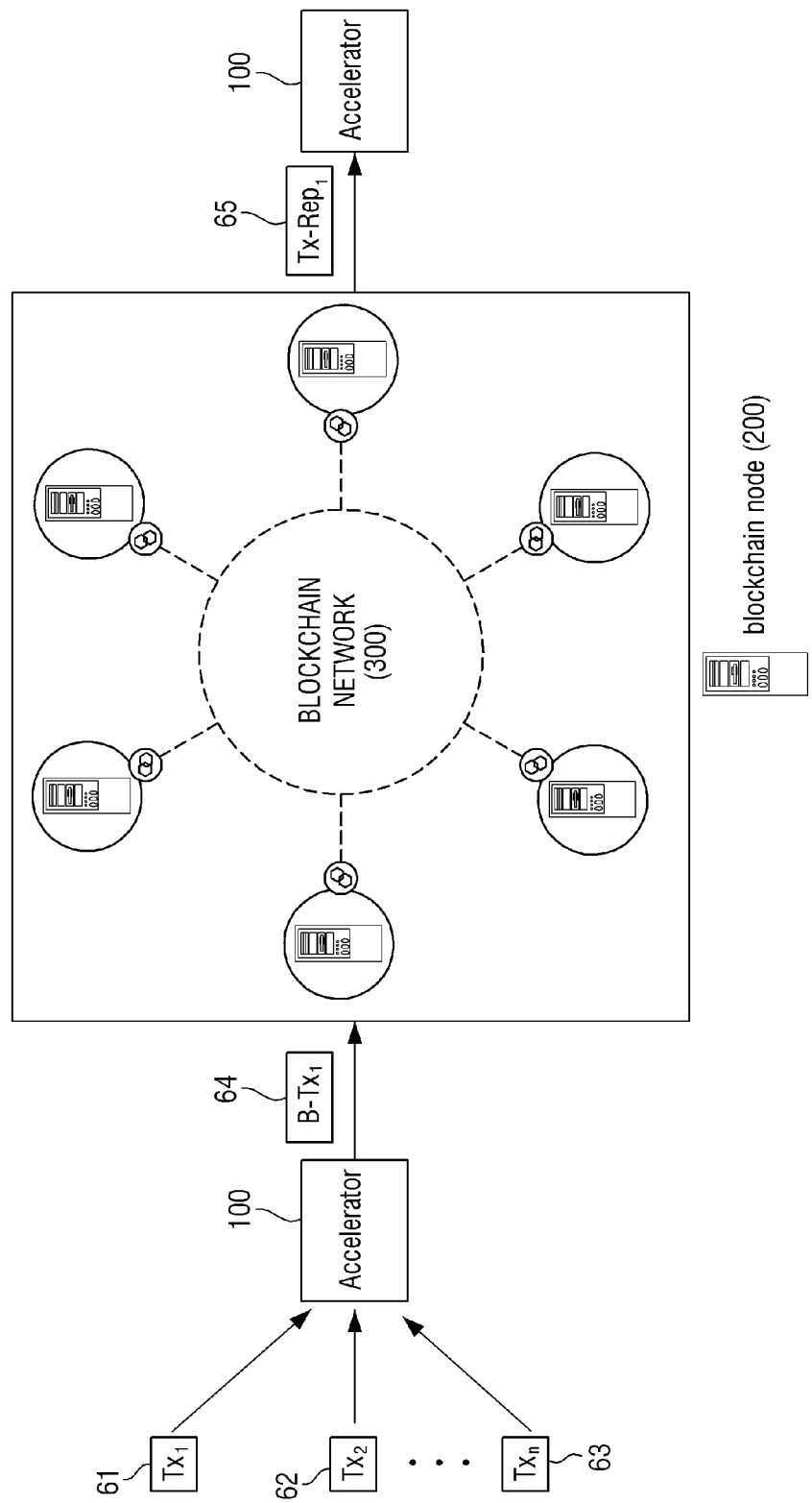
FIG. 9 is an exemplary diagram illustrating a process for monitoring a blockchain network according to some embodiments of the present disclosure.

In some embodiments, as shown in FIG. 9, the accelerator 100 exits incoming individual transactions 61 to 63, a batch transaction 64 coming into the blockchain network 300, a transaction response 65 coming from the blockchain network 300, or the like. For example, the accelerator 100 may monitor the transactions 61 to 64 and the transaction response 65 corresponding thereto, and measure the processing time of the transactions 61 to 64 based on a monitoring result. For example, the processing time may be measured by summing a time that the individual transactions 61-63 waited in the batch queue of the accelerator 100, a time from when the batch transaction 64 is sent to when the transaction response 65 is received, or the like. However, the technical scope of the present disclosure is not limited thereto, and a method for measuring the processing time may be done in any manner. In addition, the accelerator 100 may monitor and measure the inflow amount of the transaction response, and may also monitor and measure the inflow amount of the individual transactions 61 to 63 coming into the accelerator 100. The inflow (e.g. TPS) of the individual transactions 61 to 63 may refer to the number of individual transactions coming into the accelerator 100 per unit time.

In some other embodiments, the blockchain network 300 is monitored by a separate monitoring device, and the accelerator 100 may obtain monitoring information for the blockchain network 300 from the monitoring device.

It will be described with reference to FIG. 8 again.

In step S200, the batch size is adjusted based on the monitoring information. Details of adjusting the batch size will be described later with reference to FIGS. 10 to 12.

In steps S300 to S900, batch processing for one or more individual transactions requested by the client terminal 400 is performed using the adjusted batch size. For the batch processing, refer to descriptions of FIGS. 4 to 7.

Hereinafter, the detailed process of step S200 of adjusting the batch size will be described with reference to FIG. 10.

Figure 10:
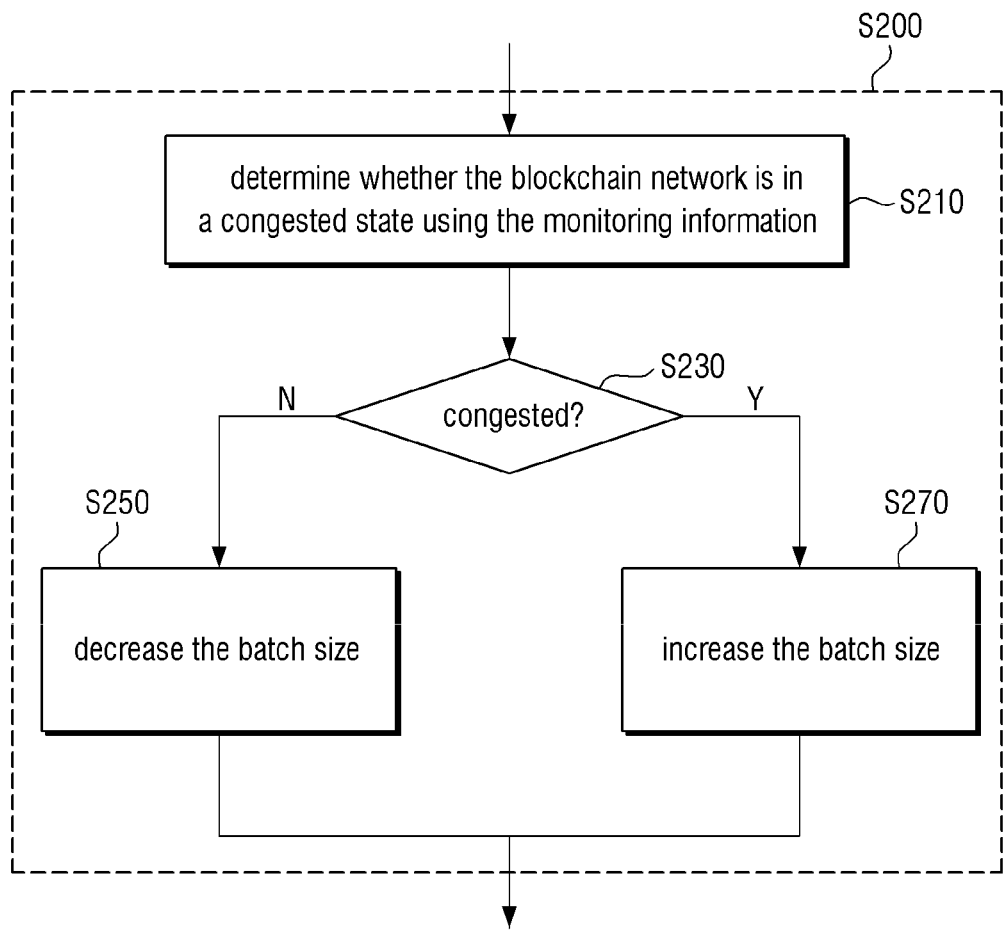
FIGS. 10 to 12 are diagrams illustrating a detailed process of batch size adjustment (step S200) shown in FIG. 8.

FIG. 10 is an exemplary flowchart illustrating a detailed process of step S200 of adjusting the batch size according to some embodiments of the present disclosure.

As shown in FIG. 10, in step S210, it is determined whether the blockchain network 300 is in the congested state using the monitoring information. For convenience of understanding, the reason for determining congestion of the blockchain network 300 will be briefly described with reference to FIG. 11.

Figure 11:
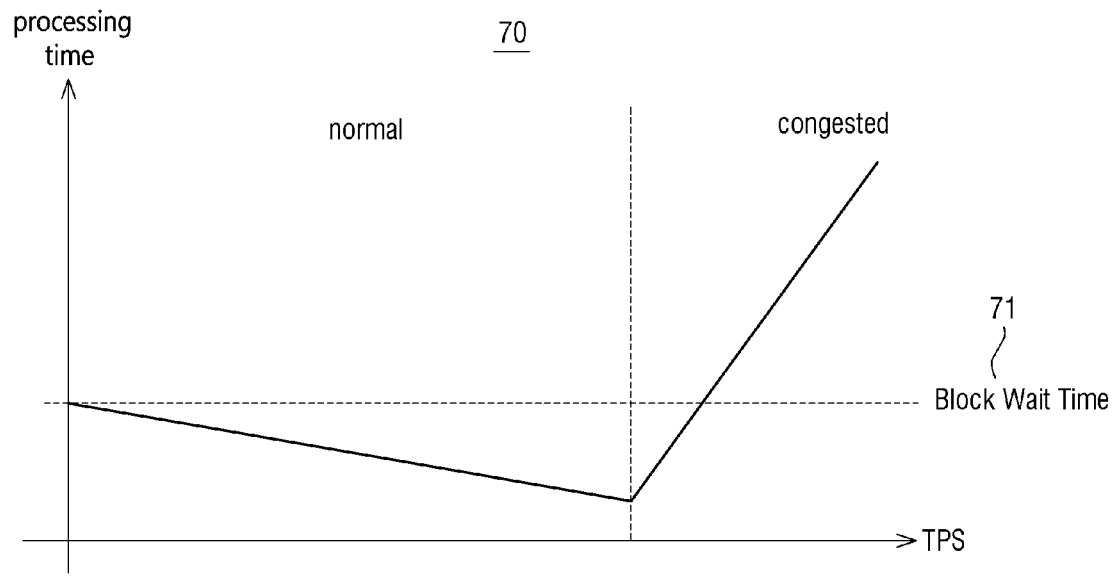

A graph 70 shown in FIG. 11 shows the relationship between TPS and a transaction processing time (i.e. a response time), in which if the TPS continues to increase to exceed a threshold transaction throughput of the blockchain network 300, the blockchain network 300 enters the congested state. For reference, in the measurement of the TPS, individual transactions and batch transactions may be counted as one transaction.

In case of the blockchain network 300 is in the congested state, when a transaction that requires a write to the blockchain occurs, a processing time of the transaction increases because the generation of a new block is delayed. Here, whether the generation of the new block is delayed may be determined through a predetermined block generation wait time 71. For example, when a time taken to generate the new block exceeds the block generation wait time 71, it may be determined that the generation of the new block is delayed. For another example, when the transaction processing time exceeds the block generation wait time 71, it may be determined that the generation of the new block is delayed. This is because the transaction processing time includes the time taken to create the new block.

The block generation wait time 71 may refer to a maximum time waiting for the blockchain network 300 to generate a block. When a size of the transaction data satisfies a block size, the blockchain network 300 may generate a new block even before the block generation wait time 71 expires.

In case of the blockchain network 300 is in the congested state, if a transaction that requires chaincode execution of the blockchain occurs, a time taken to execute the chaincode will exceed a chaincode execution wait time. The chaincode may include one or more commands, for example, for handling a smart contract function. Accordingly, when a time until the execution of the chaincode is completed takes longer than the chaincode execution wait time, it may be determined that the blockchain network is in the congested state.

If batch processing is performed while the blockchain network 300 is in the congested state, the TPS is decreased to alleviate congestion and the transaction processing time is decreased. Therefore, when the blockchain network 300 is in the congested state, it is necessary to activate the batch processing function or increase the batch size.

On the contrary, when the blockchain network 300 is in the normal state, the transaction processing time may decrease as the TPS increases. This is because increasing the TPS quickly satisfies the block size, so that a new block may be generated even before the block generation wait time 71 expires.

If the batch processing is performed when the blockchain network 300 is in the normal state, the transaction processing time may rather increase. This is because, when performing the batch processing, a time taken to generate a batch transaction (e.g. a time that an individual transaction waits in the batch queue before satisfying the batch size) must be further included in the transaction processing time. Therefore, when the blockchain network 300 is in the normal state, it is necessary to deactivate the batch processing function or decrease the batch size.

In conclusion, it may be understood that since an adjustment operation (or activation/deactivation operation of the batch processing function) of the batch size has to be changed depending on whether the blockchain network 300 is in the congested state, the determination for the congested state is made in step S210.

In step S210, a specific method for determining whether the blockchain network 300 is in the congested state may vary depending on embodiments.

In some embodiments, the determination may be performed based on whether generation of a new block is delayed. In other words, if the generation of a new block is delayed, it may be determined that the blockchain network 300 is in the congested state, and in the opposite case, it may be determined to be in the normal state. Whether the generation of the new block is delayed may be determined based on examples as described above.

In some embodiments, the determination may be determined based on whether the time until the execution of the chaincode is completed takes longer than the chaincode execution wait time.

In some embodiments, the determination may be determined based on trend information about the transaction processing time. The trend information may be obtained by analyzing or processing the monitoring information about the blockchain network 300. For convenience of understanding, the present embodiment will be described further with reference to FIG. 12.

Figure 12:
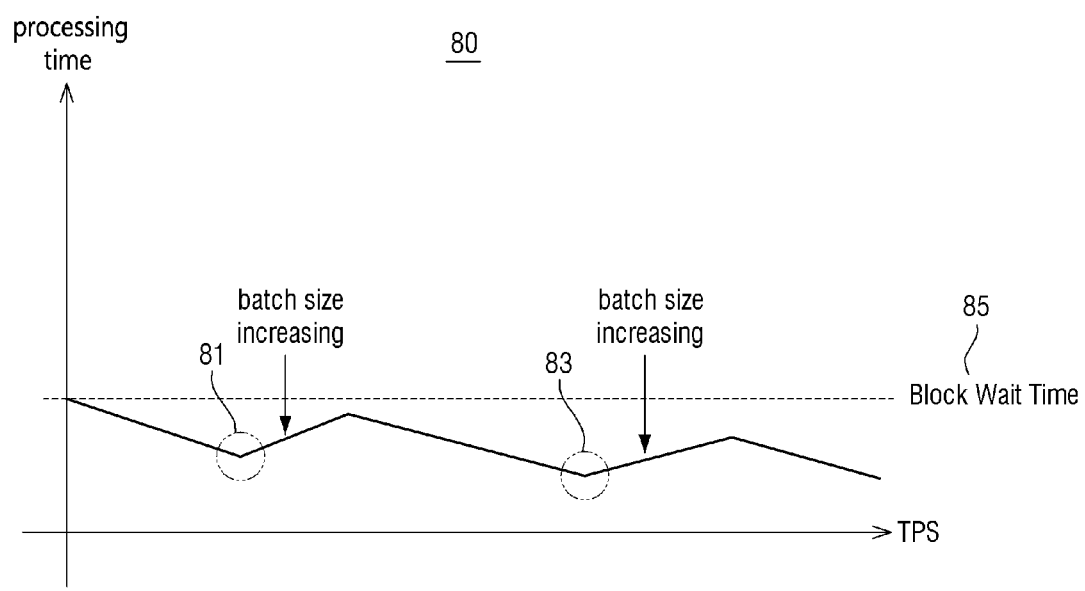
Figure 13:
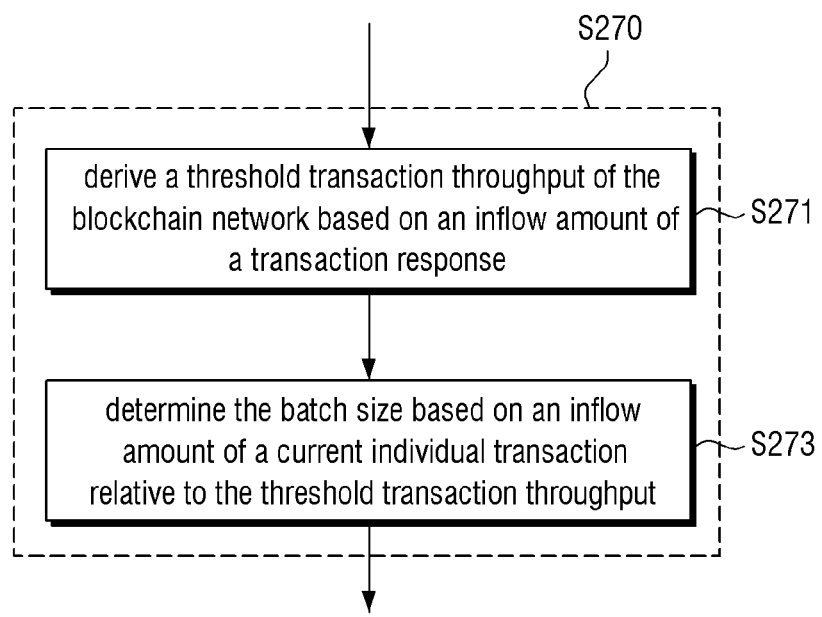
FIG. 13 is an exemplary flowchart illustrating a detailed processes of batch size decreasing (step S250) and batch size increasing (step S270) shown in FIG. 270.

A graph 80 illustrated in FIG. 12 shows the relationship between the TPS and the transaction processing time that may appear when the batch size is adjusted depending on the trend information.

Referring to FIG. 12, inflection points 81 and 83 at which the trend of the transaction processing time is switched may be extracted by analyzing the monitoring information, in which a state of the blockchain network 300 may be determined based on information of the inflection points 81 and 83. For example, a first inflection point 81 indicates a point at which the transaction processing time is switched from decreasing trend to increasing trend as the TPS increases. The fact that the transaction processing time has switched to the increasing trend means that the current TPS has exceeded the threshold transaction throughput of the blockchain network 300, so that it may be seen that at the time when the first inflection point 80 appears, the blockchain network 300 enters the congested state. Therefore, if the batch size is increased at the time when the first inflection point 80 is detected, the transaction processing time may be switched from the increasing trend to the decreasing trend again, as shown in FIG. 12.

For reference, since a delay of generating a new block may be a post symptom (e.g. FIG. 11) that appears when the blockchain network 300 is already congested, it is difficult to quickly determine a congestion state. However, since the inflection points 81 and 83 are indicators that quickly indicate when the blockchain network 300 has entered the congested state, detection of the congestion state may be made quickly, so that batch size adjustment may be performed at an appropriate point in time. Accordingly, as shown in FIG. 12, even if the TPS continues to increase, the transaction processing time may not exceed the block generation wait time 85, and the transaction processing speed (i.e. response time) of the system may be greatly improved.

It will be described with reference to FIG. 10 again.

In steps S230 to S270, the batch size is adjusted based on a determination result of the congestion state. Specifically, in response to determining that the blockchain network 300 is in the congested state, the batch size may be increased. Alternatively, the batch processing function may be activated. In the opposite case, the batch size may be decreased or the batch processing function may be deactivated.

In steps S250 and S270, a specific process for determining an adjustment value of the batch size is shown in FIG. 12. FIG. 12 illustrates a detailed process of step S270 of increasing the batch size as an example, but the detailed process may be applied to a case of reducing the batch size. Hereinafter, a method for determining an adjustment value of a batch size will be described with reference to FIG. 12.

As shown in FIG. 12, in step S271, a threshold transaction throughput of the blockchain network 300 is derived based on an inflow amount of a transaction response.

Here, the inflow amount of the transaction response may be monitored when the blockchain network 300 is in the congested state, and may refer to the inflow amount of the transaction response coming into the accelerator 100 from the blockchain network 300.

The specific way of deriving the threshold transaction throughput may vary depending on an embodiment.

In some embodiments, the threshold transaction throughput may be derived by statistically processing the monitored transaction response inflow amount when the blockchain network 300 is in the congested state. Here, the statistical processing may include a processing manner such as an arithmetic mean, a moving average, a representative value (e.g. a median value, an average value, a mode, or the like), but the technical scope of the present disclosure is not limited thereto.

Further, in some embodiments, the threshold transaction throughput may be updated continuously. For example, each time the blockchain network 300 enters the congested state, a new threshold transaction throughput may be derived and updated. For example, the threshold transaction throughput may be derived based on a first transaction response inflow amount monitored at a first time point, and the derived threshold transaction throughput may be updated based on a second transaction response inflow amount monitored at a second time point after the first time point. Both the first time point and the second time point may refer to a specific time point when the blockchain network 300 is in the congested state or enters the congested state.

In step S273, the adjustment value of the batch size may be determined based on an inflow amount of a current individual transaction relative to the threshold transaction throughput. The inflow amount of the individual transaction may refer to the inflow amount of the individual transaction coming into the accelerator 100.

The specific way of determining the adjustment value of the batch size may vary depending on an embodiment.

In some embodiments, the adjustment value of the batch size may be determined according to Equation 1 below. In Equation 1 below, the inflow TPS refers to the inflow amount of the individual transaction coming into the accelerator 100, and the threshold TPS refers to the threshold transaction throughput of the blockchain network 300.

Batch Size=(Inflow TPS/Threshold TPS)+1     <Equation 1>

According to Equation 1, when the inflow TPS does not exceed the limit TPS, the batch size may be decreased to 1 so that the batch processing function may be deactivated. When the inflow TPS exceeds the limit TPS, the batch size may be increased.

So far, the method for accelerative processing the transaction and the batch size adjusting function according to some embodiments of the present disclosure have been described in detail with reference to FIGS. 8 to 13. As described above, the batch size is adjusted based on whether the blockchain network 300 is in the congested state, thereby improving the overall transaction processing speed of the system. In particular, since the method described above is performed by a separate accelerator 100, an internal logic of the blockchain based system does not need to be modified. Therefore, excellent portability may be provided and it may be widely used in various blockchain based systems.

Hereinafter, an exemplary computing device 500 that can implement an apparatus according to various embodiments of the present disclosure (e.g., accelerator 100) will be described with reference to FIG. 14.

FIG. 14 is an example hardware diagram illustrating a computing device 500.

As shown in FIG. 14, the computing device 500 may include one or more processors 510, a bus 550, a communication interface 570, a memory 530, which loads a computer program 591 executed by the processors 510, and a storage 590 for storing the computer program 591. However, FIG. 14 illustrates only the components related to the embodiment of the present disclosure. Therefore, it will be appreciated by those skilled in the art that the present disclosure may further include other general purpose components in addition to the components shown in FIG. 14.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. For example, when the computer program 591 is loaded into the memory 530, the logic (or the module) as shown in FIG. 4 may be implemented on the memory 530. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to include a communication module well known in the art of the present disclosure.

The storage 590 can non-temporarily store one or more computer programs 591. The storage 590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. When the computer program 591 is loaded on the memory 530, the processor 510 may perform the methods/operations in accordance with various embodiments of the present disclosure by executing the one or more instructions.

For example, the computer program 591 may include instructions to perform operations of obtaining monitoring information about a blockchain network, determining whether the blockchain network is in a congested state based on the monitoring information, adjusting a batch size based on a determination result, and performing batch processing for one or more individual transactions using the adjusted batch size. In such a case, accelerator 100 in accordance with some embodiments of the present disclosure may be implemented via the computing device 500.

So far, various embodiments included in the technical features of the present disclosure and effects according to the embodiments have been described with reference to FIGS. 1 to 14. Effects according to the technical features of the present disclosure are not limited to the above mentioned effects. Other effects that are not mentioned will be clearly understood by those skilled in the art from the following description.

The technical features of the present disclosure described with reference to FIGS. 1 to 14 may be implemented as computer readable codes on a computer readable medium. The computer readable recording medium may be, for example, a removable recording medium (CD, DVD, Blu-ray disc, USB storage device, removable hard disk) or a fixed recording medium (ROM, RAM, computer equipped hard disk). The computer program recorded on the computer readable recording medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, it should not be understood that the operations must be performed in the specific order or sequential order shown, or that all the illustrated operations must be executed to achieve the desired results. In certain circumstances, multitasking and parallel processing may be advantageous. Moreover, the separation of the various configurations in the embodiments described above should not be understood as requiring that separation, and it should be understood that the described program components and systems may generally be integrated together into a single software product or packaged into multiple software products.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. An accelerated transaction processing apparatus comprising:
a memory for storing one or more instructions;
a communication interface for communicating with a blockchain network; and
a processor,
wherein the processor is configured, by executing the one or more instructions, to perform operations including:
determining whether the blockchain network is in a congested state based on monitoring information about the blockchain network;
adjusting a batch size based on a result of the determination; and
performing batch processing for one or more individual transactions using the adjusted batch size,
wherein the operations further includes:
identifying, by analyzing the monitoring information, an inflection point at which a trend of a transaction processing time of the blockchain network is changed; and
determining whether the blockchain network is in the congested state based on the identified inflection point,
wherein the processor is further configured to:
derive a threshold transaction throughput of the blockchain network based on an amount of inflowing transaction responses from the blockchain network; and
adjust the batch size based on the derived threshold transaction throughput, wherein the processor is further configured to adjust the batch size based on an amount of inflowing individual transactions into the apparatus relative to the derived threshold transaction throughput.

2. The apparatus of claim 1, wherein the processor is further configured to determine that the blockchain network is in the congested state when generation of a new block is delayed.

3. The apparatus of claim 1, wherein the processor is further configured to determine that the blockchain network is in the congested state when a chaincode execution time exceeds a chaincode execution wait time.

4. The apparatus of claim 1, wherein the processor is further configured to determine that the blockchain network is in the congested state when the transaction processing time of the blockchain network exceeds a predetermined block generation wait time.

5. The apparatus of claim 1, wherein the monitoring information comprises trend information about the transaction processing time of the blockchain network.

6. The apparatus of claim 1, wherein the processor is further configured to, in response to determining that the blockchain network is not in the congested state, decrease the batch size or deactivate the batch processing.

7. The apparatus of claim 1, wherein the processor is further configured to, in response to determining that the blockchain network is in the congested state, increase the batch size or activate the batch processing.

8. The apparatus of claim 1, wherein the amount of the inflowing transaction responses is monitored when the blockchain network is in the congested state.

9. The apparatus of claim 1, wherein the processor is further configured to:
derive the threshold transaction throughput based on a first transaction response inflow amount monitored at a first time point; and
update the derived threshold transaction throughput based on a second transaction response inflow amount monitored at a second time point.

10. The apparatus of claim 1, wherein the communication interface further communicates with another apparatus for accelerative processing a transaction,
wherein the processor is further configured to reflect information received from the another apparatus through the communication interface to at least one of determining whether the network is in the congested state and adjusting the batch size.

11. The apparatus of claim 1, wherein the communication interface further communicates with a storage accessed by a plurality of apparatuses for accelerative processing a transaction,
wherein the processor is further configured to reflect information obtained by inquiring to the storage through the communication interface to at least one of determining whether the network is in the congested state and adjusting the batch size, wherein the information is recorded by another apparatus for accelerative processing a transaction.

12. The apparatus of claim 1, wherein the processor is configured to:
classify the one or more individual transactions according to predetermined classification criteria;
insert the classified individual transactions into batch queues according to a classification result; and
aggregate, in response to determining that a number of individual transactions in a particular batch queue satisfies the adjusted batch size, the individual transactions in the particular batch queue to generate a batch transaction.

13. The apparatus of claim 12, wherein the classification criteria comprise at least one of an identifier of a smart contract associated with an individual transaction, a channel identifier associated with an individual transaction, and a type of an individual transaction.

14. The apparatus of claim 12, wherein the processor is further configured to generate the batch transaction in response to an expiration event of a batch timer regardless of the number of individual transactions in the particular batch queue.

15. A method for accelerated processing one or more individual transactions associated with a blockchain network in a computing device, comprising:
obtaining monitoring information about the blockchain network;
determining whether the blockchain network is in a congested state based on the monitoring information;
adjusting a batch size based on a result of the determination; and
performing batch processing for the one or more individual transactions using the adjusted batch size,
wherein the determining comprises:
identifying, by analyzing the monitoring information, an inflection point at which a trend of a transaction processing time of the blockchain network is changed; and
determining whether the blockchain network is in the congested state based on the identified inflection point,
wherein the processor is further configured to:
derive a threshold transaction throughput of the blockchain network based on an amount of inflowing transaction responses from the blockchain network; and
adjust the batch size based on the derived threshold transaction throughput,
wherein the processor is further configured to adjust the batch size based on an amount of inflowing individual transactions into the apparatus relative to the derived threshold transaction throughput.

16. A computer program stored on a non-transitory computer-readable recording medium, that when executed by a computing device, performs operations comprising:
obtaining monitoring information about a blockchain network;
determining whether the blockchain network is in a congested state based on the monitoring information;
adjusting a batch size based on a result of the determination; and
performing batch processing for one or more individual transactions using the adjusted batch size,
wherein the determining comprises:
identifying, by analyzing the monitoring information, an inflection point at which a trend of a transaction processing time of the blockchain network is changed; and
determining whether the blockchain network is in the congested state based on the identified inflection point,
wherein the processor is further configured to:
derive a threshold transaction throughput of the blockchain network based on an amount of inflowing transaction responses from the blockchain network; and
adjust the batch size based on the derived threshold transaction throughput,
wherein the processor is further configured to adjust the batch size based on an amount of inflowing individual transactions into the apparatus relative to the derived threshold transaction throughput.

\* \* \* \* \*